United States Patent
Murray et al.

[11] 3,720,336
[45] March 13, 1973

[54] ROTATING AND TILTING DOUBLE BED TRAILER

[76] Inventors: Glen W. Murray, 1519 West 4180 South, Salt Lake City; Donald C. Coy, 1021 North 400 West, Bountiful, both of Utah

[22] Filed: Oct. 29, 1971

[21] Appl. No.: 193,795

[52] U.S. Cl. ................................. 214/505, 298/8 R
[51] Int. Cl. ............................................. B60p 1/28
[58] Field of Search....... 214/505, 506, 501, 85, 85.1; 298/8 R, 8 H, 5; 180/5

[56] References Cited

UNITED STATES PATENTS

| | | | |
|---|---|---|---|
| 1,392,835 | 10/1921 | Levin | 214/505 X |
| 3,536,214 | 10/1970 | Sorg et al. | 214/85 |

*Primary Examiner*—Albert J. Makay
*Attorney*—B. Deon Criddle

[57] ABSTRACT

A rotating and tilting double bed trailer for use with lightweight off-the-road vehicles, such as snowmobiles, motorcycles, all terrain wheeled vehicles and the like. The trailer has a double bed that is capable of full circle rotation, and each bed tilts individually to load or unload an off-the-road vehicle. A positive locking of the tiltable beds in either a forward position or a reversed position is accomplished by a locking turntable plate on which the tiltable beds are mounted. The tiltable beds have fold-up front and rear bed extensions hinged to their ends to help contain items carried on the bed, and to serve as a ramp means during loading and unloading of the trailer.

7 Claims, 4 Drawing Figures

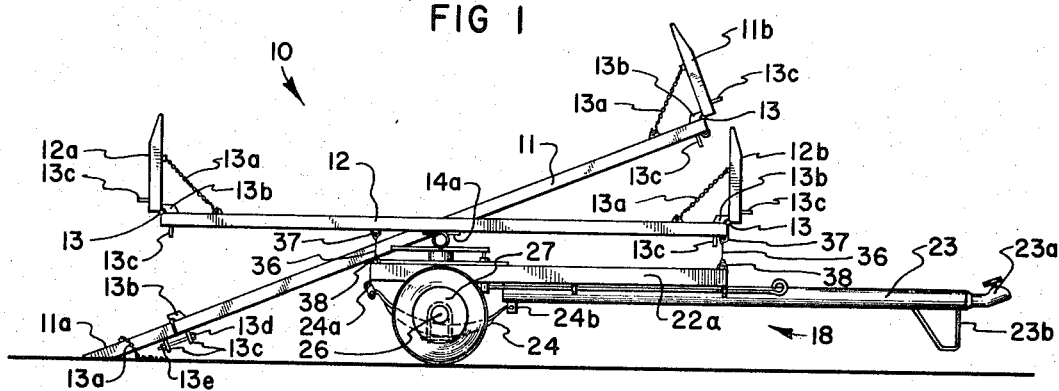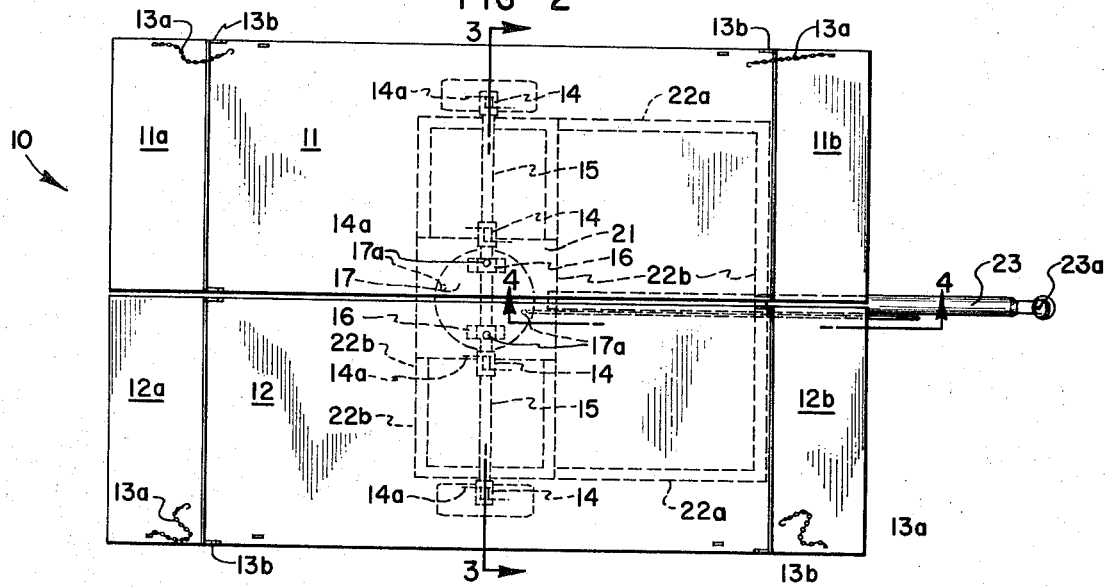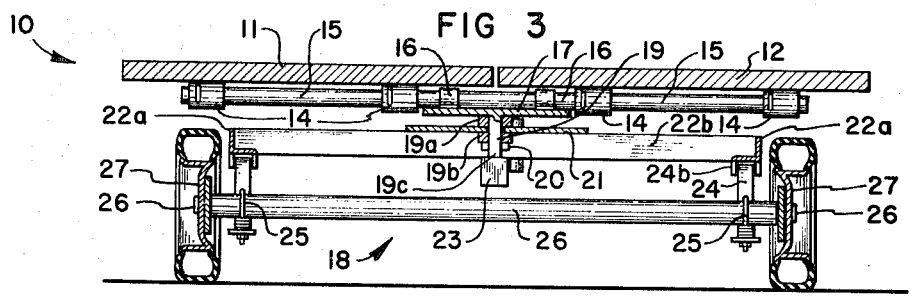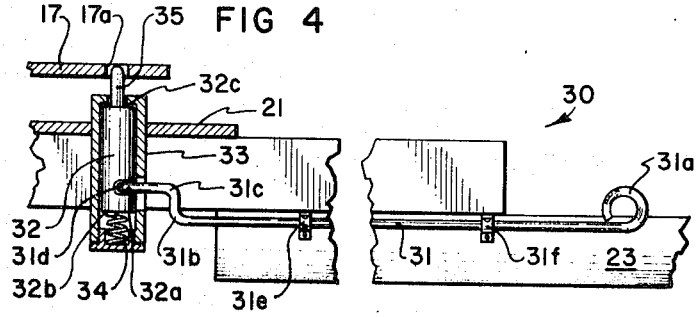
INVENTORS:
GLEN W. MURRAY
DONALD C. COY
BY: R. Dean Liddle
ATTORNEY

ROTATING AND TILTING DOUBLE BED TRAILER

BRIEF DESCRIPTION OF THE INVENTION

1. Field of the Invention

This invention relates to trailers used for over the road transport of lightweight vehicles.

2. Prior Art

The use of transport trailers with beds thereon which are capable of both rotation and tilt, to facilitate loading and unloading of vehicles, have long been known. U.S. Pat. No. 1,499,767, for example, discloses a vehicle on which a large truck type vehicle can be carried and rotated. This patent is concerned primarily with road construction operations and discloses apparatus for use where a temporary road used by dump trucks is often too narrow to permit the trucks to be turned around. The rotating bed of the MacLean patent provides a means to completely rotate such dump trucks. U.S. Pat. No. 1,853,980 teaches a rotatable platform which is also capable of tilting during vehicle loading or unloading, and vehicle beds made tiltable for loading and unloading purposes are shown in U.S. Pat. Nos. 2,418,567, 2,452,681 and 2,485,869. U.S. Pat. No. 3,338,448 shows a trailer having two non-rotatable widely separated beds which are both tiltable to accommodate the wheels of a wide, farm-type vehicle as it is moved onto and off of a carrying vehicle.

Tiltable trailers are generally used with large load carrying trucks or farm vehicles where tilting of the trailer bed is essential to loading of a single vehicle and where bed rotation, when provided, is generally for the sole purpose of reversing the direction of travel of a single carried vehicle.

With the increasing popularity of snowmobiles, all terrain vehicles, motorcycles and other recreational vehicles, there has been an increased need for adaptable means to carry them. Particularly with snowmobiles, such carrying means must provide for loading or unloading to or from very irregular terrain. For example, the snowmobiles may have to be loaded from or to accumulated snow alongside a roadway at the side of the trailer or may be moved over the rear of the trailer. However, since no reverse gear is provided for many such machines, the full rotation of the trailer bed is necessary. Also, since frequently a pair of such machines are carried, it must be possible to individually load and unload each of them.

SUMMARY OF THE INVENTION

The principal object of the present invention is to provide a two wheel trailer having a bed composed of independently tiltable bed sections which may be fully rotated together about a vertical axis.

Other objects are to provide means to releasably lock the tilting bed to a trailer frame when the bed is in either a forward or a pivoted reverse position.

Principal features of the present invention include a two wheel trailer frame which is to be pulled by a car or other vehicle and which will carry a plurality of lightweight off-the-road vehicles, or the like, in a side by side arrangement.

The trailer includes a bed with two bed sections, each of which can be individually tilted to contact the ground. The individual tilting bed sections have hinged ends that can be raised and locked in an upright attitude when the trailer is to be moved, or that can be lowered to contact the ground to provide a ramp means to facilitate movement onto or off of the trailer bed.

The trailer bed is rotatably mounted by a bearing means which supports the individual bed sections and provides rotational support as the trailer bed sections are revolved through a full circle.

A pin locking means is included on the trailer to releasably maintain the trailer bed in a forward facing position, side facing positions, or in a rotated rear facing position. The pin locking means is spring loaded so that a locking pin is biased through a turntable plate on which the individual bed sections are both pivotally mounted. The pin is depressed against the bias of the spring, by an operator, when the rotation of the turntable plate mounting the trailer bed is desired.

The two bed sections are secured to a shaft extending from the turntable plate by spring loaded pivots. The springs of the spring loaded pivots bias the individual bed sections to a parallel attitude with respect to the trailer, but yield when a bed section is tilted.

A cable linking the individual bed sections to the trailer frame may be employed to positively maintain the parallel attitude of the bed sections with respect to the frame during trailer movement.

Additional objects and features of the invention will become apparent from the following detailed description and drawings, disclosing what is presently contemplated as being best modes of the invention.

THE DRAWINGS

FIG. 1 is a side elevation view of the trailer showing one bed section maintained in a horizontal attitude with respect to the trailer frame, with the other bed section in a lowered position;

FIG. 2, a top plan view of the trailer showing the trailer frame, with the bed section tilting means and turntable structure shown in dotted lines;

FIG. 3, a sectional view, taken along line 3—3 of FIG. 2; and

FIG. 4, a sectional view taken along line 4—4 of FIG. 2.

DETAILED DESCRIPTION

Referring now to the drawings:

In the illustrated preferred embodiment, the rotating and tilting double bed trailer is shown generally at 10. The trailer includes a pair of bed sections 11 and 12, having ends 11a and 11b and 12a and 12b, respectively, and each bed section is arranged to rotate about a hinge 13 extending across an end of the bed section.

The bed sections 11 and 12 each have a pair of spaced journal boxes 14 on the bottom thereof and shaft 15 is journaled through the journal boxes. Shaft 15 is permanently secured by clamps 16 to the top of a turntable plate 17. Rotation of shaft 15 within the journal boxes 14 tilts the bed sections 11 and 12 to a desired angle. Springs 14a, within the journal boxes and connected between the boxes and shaft 15 bias the bed sections 11 and 12 towards a normal position parallel to and above a trailer frame, shown generally at 18. Turntable plate 17, as shown best in FIG. 3, has a post 19 extending perpendicularly downwardly therefrom. Post 19 extends through and is maintained within bearings 19a and 19b by a lock nut 20 that is turned onto a threaded end 19c of post 19.

A fixed mounting plate 21, positioned between bearings 19a and 19b, forms part of the trailer frame 18. Frame 18 also has side and cross rails 22a and 22b, respectively, and a tongue 23 that extends from the cross rails 22b. A coupling means 23a is provided on the free end of tongue 23 for coupling the trailer 10 to a towing vehicle, now shown. A skid 23b, projecting downwardly from tongue 23, provides a support for the tongue when the coupling means 23a is disconnected from a towing vehicle.

An axle 26 is suspended across the width of frame 18 by springs 24, spring mounts 24a and 24b, and U-bolt shackles 25. The ends of axle 26 have wheels 27 mounted thereon.

As shown best in FIG. 4, a turntable plate locking means 30 is provided to releasably secure the turntable plate 17. Locking means 30 consists of a rod 31 journaled through brackets 31e and 31f on tongue 23, and having a loop 31a formed in one end. A crank is formed by bends 31b and 31c intermediate the ends of the rod. The other end of rod 31 extends into a hole 32a in the base of a plunger 32. Plunger 32 slides within a cylinder 33 and is biased upwardly by a spring 34 mounted in the cylinder beneath the plunger. A rod 35 extends from the top 32c of plunger 32, through the top of housing 33, and is biased by spring 34 towards the turntable plate 17. When properly aligned, rod 35 will enter into a hole 17a in turntable plate 17, thereby preventing rotation of the plate. To withdraw rod 35 from hole 17a, it is only necessary to rotate rod 31. As the rod is rotated, the crank portion rotates to move plunger 32 down.

Bed section ends 11a, 11b, 12a and 12b are hinged at 13 to their respective bed sections so that they are rotatable through ninety degrees of arc from positions forming continuations of the bed sections to positions extending essentially normal to the bed sections. Stops 13b on the bed sections limit rotation of the bed section ends so that they do not rotate past upright positions and chains 13a anchored to the section ends and releasably hooked to anchors on the bed sections to hold the section ends in their upright positions. When the chains are unhooked the section ends can pivot around hinges 13 until they abut the bed section and form continuations thereof. Bolts 13d (FIG. 1) are inserted through eyes 13c on the bed sections and the section ends to secure the section ends to the bed sections.

The horizontal attitudes of the bed sections are maintained by the springs 14a and by the attachment of cables 36 between rings 37 on the bed sections 11 and 12 and rings 38 on the top of the trailer frame 22.

The trailer can be connected by conventional coupling means 23a on the end of tongue 23 to a towing vehicle. When unloading is desired, cables 36 are released and the bed section is again tilted. Or, if unloading to the side or rear is required, the locking means 30 is released, as has been herein explained, and the turntable plate 17 is rotated prior to release and tilting of the bed section.

The rotating and tilting trailer can be positioned along side the side of a roadbed and one or both beds can be rotated and elevated to contact accumulations of snow or dirt proximate to the roadbed surface. A ramp is thus provided over which each vehicle carried on the trailer can be driven or moved forward off the side of the trailer.

Although a preferred form of our invention has been herein disclosed, it is to be understood that the present disclosure is by way of example and that variations are possible without departing from the subject matter coming within the scope of the following claims, which subject matter we regard as our invention.

We claim:

1. A rotating and tilting double bed trailer comprising
    a frame;
    at least one axle means on the ends of which are attached wheels supporting the frame;
    a tongue extending from the said frame having attachment means on its end for connection with a towing vehicle;
    a turntable plate;
    a trailer bed secured to the said frame by said turntable plate whereby the trailer bed can be rotated through a full circle, which trailer bed includes at least two bed sections, proximate to one another, which are connected by pivot means to a common shaft on the turntable plate such that they can be individually and independently tilted for loading and unloading purposes.

2. A rotating and tilting double bed trailer as in claim 1, wherein
    the turntable plate includes a post extending perpendicularly downwardly from the center thereof into bearing means fixed to said trailer frame.

3. A rotating and tilting double bed trailer as in claim 2, wherein
    the bearing means includes a pair of bearings, separated by said turntable plate, with the post maintained in the said bearings and fitted through said turntable plate.

4. A rotating and tilting double bed trailer as in claim 1, further including
    means for locking the trailer bed rotatable turntable means to the trailer frame to prevent undesired rotation of the trailer bed.

5. A rotating and tilting double bed trailer as in claim 4, wherein
    the locking means consists of a spring biased rod biased into at least one hole in the said turntable plate, and means for retracting said rod from the hole against the bias of said spring.

6. A rotating and tilting double bed trailer as in claim 1, further including
    means biasing the individual tiltable beds to a horizontal attitude.

7. A rotating and tilting double bed trailer as in claim 1, further including
    means to releasably lock the tiltable beds in their horizontal attitudes.

* * * * *